United States Patent

McAuliffe

[15] 3,679,882

[45] July 25, 1972

[54] FOURIER DIGITAL FILTER OR EQUALIZER AND METHOD OF OPERATION THEREFOR

[72] Inventor: Gerald K. McAuliffe, Mahopac, N.Y.

[73] Assignee: International Business Machines Corporation, Armonk, N.Y.

[22] Filed: June 11, 1970

[21] Appl. No.: 45,520

[52] U.S. Cl. ....................235/156, 444/1

[51] Int. Cl. ....................G06f 7/38

[58] Field of Search ....................235/152, 156, 150.53; 324/77 D, 77 G; 328/167; 444/1

[56] References Cited

UNITED STATES PATENTS

| | | | |
|---|---|---|---|
| 3,544,775 | 12/1970 | Bergland et al. | 235/156 UX |
| 3,517,173 | 6/1970 | Gilmartin, Jr. et al. | 235/156 |
| 3,403,227 | 9/1968 | Malm | 324/77 X |

OTHER PUBLICATIONS

H. Helms, "FFT Method of Computing Difference Equations and Simulating Filters," IEEE Trans. on Audio & Electro., June 1967, pp. 85–90.

R. C. Brogioli, "FFT Correlation Versus Direct Discrete Time Correlation" Proc. of IEEE, Sept. 1968, pp. 1602–1604.

W. L. Miranker, "Recovery of Diffusion– Deteriorated Signals," IBM Tech. Disclosure Bulletin, June 1962, pp. 28–30.

*Primary Examiner*—Eugene G. Botz
*Assistant Examiner*—David H. Malzahn
*Attorney*—Hanifin and Jancin and T. J. Kilgannon, Jr.

[57] ABSTRACT

An equalizer system is disclosed which includes a Fourier transform device having first and second input terminals and a separator connected to its output which provides a first output in the time domain and a second output in the frequency domain. A modified version of the second output is obtained by modifying it by a given filter characteristic. The first output and the modified second output are applied to first and second adding means wherein the values of the real and imaginary parts of these outputs are added algebraically to provide an equalized output in the time domain at the output of the first adding means while the output of the second adding means is applied via a feedback path to the second input terminal of the Fourier transform device along with an input on the first terminal thereof which occurs subsequent to the initial input applied to the first terminal. The method of operation consists in adding algebraically the values of the real and imaginary parts of a block of data which has been previously modified by a filter characteristic and transformed to the frequency domain to provide an output consisting of N parts; applying this output to a Fourier transform device to convert it to an apparent frequency domain of N complex parts; separating the output in the apparent frequency domain into frequency and time domain components each of N complex parts and, adding algebraically the values of the real and imaginary parts of the time domain component to provide an equalized or filtered block of data consisting of N real parts in the time domain.

22 Claims, 5 Drawing Figures

INVENTOR
GERALD K. McAULIFFE

BY Thomas J. Kilgannon Jr.
ATTORNEY

FOURIER DIGITAL FILTER OR EQUALIZER AND METHOD OF OPERATION THEREFOR

BACKGROUND OF THE INVENTION

1. Field of the Invention

This invention relates generally to apparatus and method which is capable of providing equalized or filtered data or signals in the time domain utilizing only one Fourier transform device. More specifically, it relates to apparatus and method for providing equalized or filtered digital data in the time domain using a single fast Fourier transform device. The utilization of a single fast Fourier transform device is made possible by the recognition that the values of the real and imaginary parts of data modified by a desired filter characteristic may be algebraically added and the result treated as N real numbers in an apparent frequency domain and fed back to another input terminal of the fast Fourier transform device. This modified data after transformation is applied to a separator and an output thereof consisting of N complex numbers in the time domain is subjected to the algebraic addition of the values of the real and imaginary parts thereof to provide a filtered or equalized output of data which was originally applied as unfiltered or unequalized data in the time domain.

2. Description of the Prior Art

One prior art technique for providing equalized or filtered data operates on a single block of data in the time domain in any given time period. An input block of data in the time domain is applied to a terminal of a Fourier transform device where it is converted to the frequency domain. After modifying the data in the frequency domain by a desired filter characteristic, the modified data is applied to an inverse fast Fourier transform device which provides a filtered or equalized version in the time domain of data which was initially applied as unfiltered or unequalized data in the time domain.

Other known prior art ("High Speed Convolution and Correlation" by T. G. Stockham, Jr., Spring Joint Computer Conference of the ACM, Boston, Apr. 1966) suggests operating on two blocks of input data simultaneously. The two blocks of data, one of which is delayed, are simultaneously applied to the inputs of a fast Fourier transform device where they are operated upon to provide outputs in the frequency domain. After modifying the outputs by a desired filter characteristic, the modified outputs are applied to an inverse fast Fourier transform device and, two blocks of data in the time domain, equalized or filtered relative to the input data blocks initially applied, appear at the output. The resulting data must, of course, be arranged in such a way that it assumes its proper position in time.

In the first of the two arrangements outlined hereinabove, only a single input is used to the fast Fourier transform device. Because the fast Fourier transform device can handle complex inputs, such techniques are wasteful of the available capabilities.

In the second of the two approaches outlined hereinabove, two Fourier transform devices are required whereas only a single Fourier transform device is required in the arrangement of the present application. The method and apparatus of the present invention represent a substantial improvement in the speed of operation as well as a simplification in the hardware requirements. The technique involved is also amenable to the computer simulation of filters and equalizers providing output data in filtered or equalized form of an input which has been modified by a desired filter characteristic.

SUMMARY OF THE INVENTION

In accordance with the broadest aspect of the invention, apparatus and method for providing blocks of data modified in accordance with some function in a desired domain are disclosed. In accordance with a more particular aspect of the invention, apparatus which provides equalized or filtered blocks of data in the time domain includes a Fourier transform device and means for simultaneously applying to the input of the Fourier transform device a first block of data which has been converted from the time domain to the frequency domain and a second block of data in the time domain to produce an equalized first block of data in the time domain at an output. The apparatus further includes means for separating the output of the Fourier transform device to provide an output in the frequency domain and another which is in the time domain. The output in the time domain is applied to an adder wherein the values of the real and imaginary parts of the time domain are added algebraically to provide an output block of data which is an equalized version of the first block of data. The output in the frequency domain is connected to modification means wherein it is modified by a given filter characteristic. The modified output in the frequency domain is then applied to adding means wherein the values of the real and imaginary parts of the modified output are added algebraically to provide a resultant output which is fed back to an input of the Fourier transform device as a new first block of data at the same time a new second block of data is applied to another input of the Fourier transform device.

In accordance with still more specific aspects of the present invention, first and second adding means are utilized in a filter system which includes a Fourier transform device, a separator and modifying means for modifying one of the outputs of the separator by a given filter characteristic. The adding means carry out an algebraic summation of the values of the real and imaginary parts of the outputs of the separator in the time domain and the modified second output in the frequency domain and provide an equalized output in the time domain and an output in the frequency domain. The latter is fed back as an input to the Fourier transform device along with an input block of data on another terminal which is subsequent to an originally applied block of data on the Fourier device terminal.

In accordance with a more particular aspect of the present invention, a method for providing equalized or filtered blocks of data in the time domain is provided by simultaneously introducing into a Fourier transform device a block of data which has been converted from the time domain to the frequency domain along with a second block of data in the time domain. In a subsequent step, two outputs, one in the frequency domain and another in the time domain are provided by separating the output of the Fourier transform device in a separator. The output in the frequency domain is modified by a desired filter characteristic and, by then algebraically adding the values of the real and imaginary parts of the modified output, an output in an apparent frequency domain is provided. The latter is then fed back to the Fourier transform device as new first block of data and applied to the Fourier transform device simultaneously with a new second block of data. In the meantime, the output of the separator in the time domain is processed by algebraically adding the values of the real and imaginary parts of this output thereby providing an output block of data which is a filtered version of the first block of data applied to the Fourier transform device.

In accordance with more particular aspects of this invention, a method for equalizing or filtering a block of data consisting of N real parts in the time domain is provided by algebraically adding the values of the real and imaginary parts of the block of data which has been previously modified by a filter characteristic and transformed to the frequency domain to provide an output consisting of N parts. The latter output is applied to a Fourier transform device to convert it to an apparent frequency domain of N complex parts. The last-mentioned output is separated into frequency domain and time domain components each of N complex parts. Finally, the values of the real and imaginary parts of the time domain component are added algebraically to provide an equalized block of data consisting of N real parts in the time domain.

Using the above apparatus and method, it is possible to reduce the number of fast Fourier transform devices and transformation steps to substantially increase the speed of filtering and provide a simplification of hardware. The present technique is also useful in carrying out computer simulations of filters and equalizers.

It is therefore an object of the present invention to provide a method and apparatus which provide filtered or equalized signals in a relatively simple manner.

Another object is to provide a method and apparatus which provide for operation on a continuous stream of data at an input and deliver a continuous stream of filtered or equalized data at an output.

Still another object is to provide a method and apparatus for filtering and equalizing data which requires use of only one Fourier transformation.

The foregoing and other objects, features and advantages of the invention will be apparent from the following and more particular description of preferred embodiments of the invention as illustrated in the accompanying drawings.

DETAILED DESCRIPTION OF PREFERRED EMBODIMENTS

Figure 1:
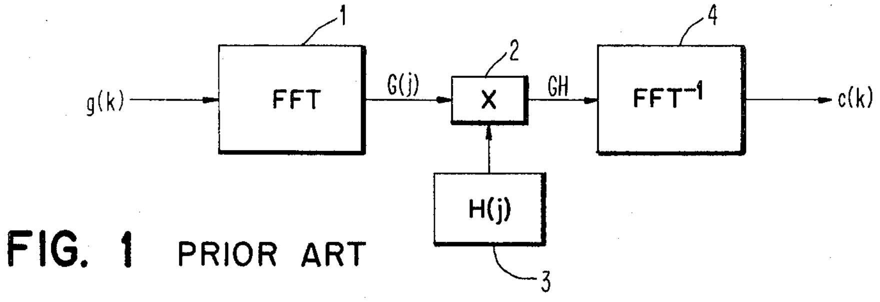
FIG. 1 PRIOR ART
FIG. 1 is a block diagram of a prior art filtering or equalizing arrangement which utilizes a single input to a fast Fourier transform device and which provides an equalized or filtered output via an inverse fast Fourier transform device.

Before proceeding with a detailed description of the preferred method and apparatus of the present invention, the novel concept involved herein may be best appreciated and placed in perspective by a brief consideration of prior art techniques. Referring now to FIG. 1 there is shown a block diagram of a prior art technique for obtaining a filtered or equalized version of a sampled analog or digital signal. A time domain waveform to be filtered is sampled and applied to a terminal of a fast Fourier transform device 1. The data which may be sampled analog or digital in nature appears as a block of data and is represented by the symbol $g(k)$, $(k = 0, 1, \ldots N-1$, in FIG. 1. The input $g(k)$ which is in the time domain is transformed into the frequency domain in the fast Fourier transform device 1 and appears at the output thereof as $G(j)$, $(j = 0, 1, \ldots N-1)$. Each component frequency is then suitably attenuated and phase shifted in a multiplier 2 in accordance with a desired filter characteristic. The filter characteristic is applied from a function generator 3 labeled $H(j)$ in FIG. 1. The output of multiplier 2 is represented by the symbol GH in FIG. 1. The output GH is applied to the input of an inverse fast Fourier transform device 4 to provide a modified version $c(k)$ of the input $g(k)$ at its output in the time domain. In the usual case, for speed of computation, the fast Fourier algorithm is utilized to compute the required discrete transforms.

In the above-described prior art approach, inputs are continuously applied and filtered or equalized outputs are continuously obtained. The approach however is wasteful in that it does not take advantage of the fact that the usual fast Fourier transform device is capable of handling two inputs simultaneously. Also, the technique requires the use of two Fourier transform devices which adds significantly to the cost of hardware arrangements and further waste in that an available terminal of a second Fourier transform device is also not utilized.

Figure 2:
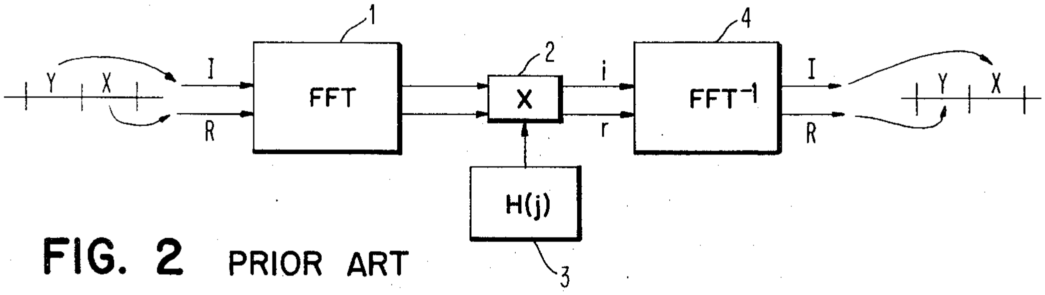
FIG. 2 PRIOR ART
FIG. 2 is a prior art filtering or equalizing technique which utilizes two inputs in the time domain to a fast Fourier transform device and which provides an equalized or filtered output in the time domain via a second fast Fourier transform device.

Another prior art arrangement ("High Speed Convolution and Correlation" by T. G. Stockham, Jr., Spring Joint Computer Conference of the ACM, Boston, Apr. 1966) overcomes the deficiencies of the arrangement of FIG. 1 to some extent by utilizing both inputs of the fast Fourier transform device. In FIG. 2, fast Fourier transform device 1 is shown having inputs applied to two input terminals thereof. Two input blocks of data which may be sampled analog or digital data in the time domain are applied simultaneously to the inputs of fast Fourier transform device 1. A first block of data labeled X in FIG. 2 is treated as a set of real numbers and applied to a terminal labeled R. A second block of data labeled Y in FIG. 2 is treated as a block of imaginary numbers and applied to a terminal I of fast Fourier transform device 1. To accomplish the simultaneous application of data blocks X and Y, data block X is delayed for an appropriate time interval. Both of the input blocks of data X,Y are simultaneously transformed in fast Fourier transform device 1 to the frequency domain and appear at the output of device 1 as real and imaginary components in the frequency domain. These components are modified in a multiplier 2 by a desired filter characteristic applied to multiplier 2 from function generator 3. The thus modified real and imaginary components are applied to a fast Fourier transform device 4 and two components in the time domain modified by the filter characteristic are provided. The real output of fast Fourier transform device 4 should then be reversed in time and thus appears as a first output segment of N numbers. The imaginary output of fast Fourier transform device is also reversed in time and appears as a second output segment of N numbers. Using the above-described technique, two output segments are supplied at once and one must be delayed with respect to the other to provide blocks of data having the same relationship as that applied at the input. The above-described technique while it is more efficient in that it takes advantage of the capabilities of known fast Fourier transform devices, it still requires the utilization of two such devices. The method and apparatus of the present invention, as will be seen from the discussion which follows, also utilizes the capabilities of known fast Fourier transform devices efficiently but, in addition, reduces the prior art requirements for such devices by one without unduly complicating the hardware requirements.

Figure 3:
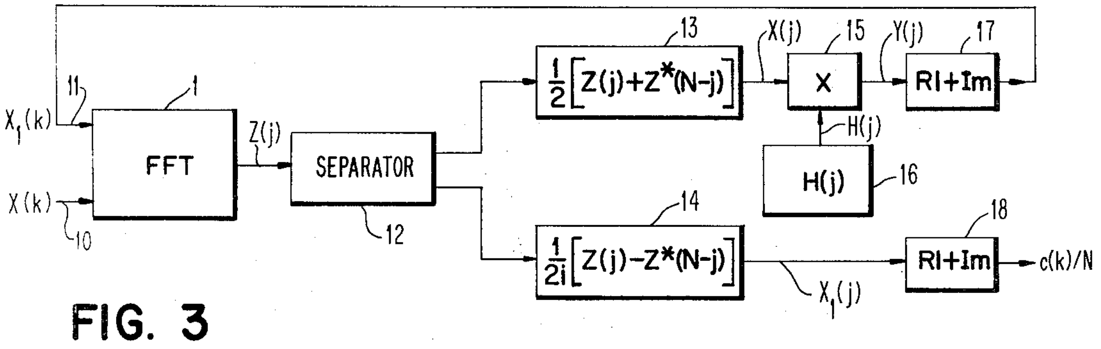
FIG. 3 is a block diagram of a filtering or equalizing arrangement in accordance with the present invention which utilizes two inputs to a single fast Fourier transform device one of which is in the time domain and the other of which is a modified version of a previous input in the frequency domain.

Referring now to FIG. 3, a partial schematic-partial block diagram of apparatus in accordance with the teaching of the present invention is shown. The sampled values of a time function $x(k)$, $(k = 0, 1, \ldots N-1)$, are applied to a terminal 10 of a fast Fourier transform device 1. Where filtering is desired, the samples are taken at the Nyquist rate or faster, of the input signal $x(t)$, i.e., at least 2 W samples per second where the bandwidth of $x(t)$ does not exceed WHz. For equalization, sampling is at the data rate.

Simultaneously with the application of the sampled data $x(k)$ on terminal 10, another set of data $x_1(k)$ is applied at terminal 11 of fast Fourier transform device 1. In general, if a set $x_1(k)$ is treated as the imaginary component of a set $x(k)$ so that the input to an FFT is $z(k) = x(k) + ix_1(k)$, $(k = 0, 1, \ldots N-1$, the transforms $X(j)$ and $X_1(j)$ can be separated as follows:

$$X(j) = ½ [Z(j) + Z^*(N-j)] \qquad \text{I.}$$

$$X_1(j) = ½i [Z(j) - Z^*(N-j)] \qquad \text{II.}$$

In FIG. 3 the output of fast Fourier transform device 1 is shown as $Z(j)$ and, $$Z(j)=X(j)+iX_1(j)$$

$$j=0, 1,\ldots N-1.$$

A separator 12 provides outputs 13 and 14 which correspond to equations I and II, respectively, above. The output shown in block 13 in FIG. 3 and shown by equation I above is in the frequency domain and is the Fourier transform $X(j)$ of the input $x(k)$ applied at terminal 10 of fast Fourier transform device 1. The output of separator 12 shown in block 14 and indicated as equation II above is in the time domain and is in fact the Fourier transform $X_1(j)$ of the input $x_1(k)$ applied at terminal 11 of fast Fourier transform device 1.

In FIG. 3, the output, shown in block 13 and corresponding to equation I, $X(j)$ is applied to a multiplier 15. Also applied to multiplier 15 from a function generator 16 is a filter function $H(j)$ which modifies the transform $X(j)$ to produce at the output of multiplier 14 a modified transform $Y(j)$.

Up to the present, all the steps shown are known in the prior art. What is new is the fact that a single fast Fourier transform device can be utilized to carry out both time to frequency and frequency to time transformations. This resulted from the recognition that the only further operations required are the algebraic addition of the values of the real and imaginary parts of the functions $Y(j)$ and $X_1(j)$. The algebraic addition of the real and imaginary values of each function are carried out in adders shown as block 17 and 18 in FIG. 3 above. Once the algebraic addition of the values of the real and imaginary portions of the function $Y(j)$ have been carried out the resulting output is treated as a function in the time domain, $x_1(k)$, consisting of N real numbers and fed back from adder 17 to terminal 11 of fast Fourier transform device 1. The input $x_1(k)$ is applied simultaneously with the application of the function $x(k)$ on terminal 10 and is, of course, delayed one frame relative to the time of its initial application on terminal 10 one frame ago.

The output $X_1(j)$ shown in block 14 is in an apparent frequency domain and, by the simple algebraic addition of the values of the real and imaginary parts of that function, an output from adder 18 results which is in the time domain and is a filtered or equalized version $c(k)/N$ of the function $x(k)$ initially applied on terminal 10 of fast Fourier transform device 1.

The proof that the above technique is valid is straightforward.

Let (R + I) denote the operation of adding algebraically the real and imaginary parts of the operand:

$$(R+I)\,(x+iy)=x+y \qquad \text{III.}$$

The Fourier transform operator F is defined by:

$$Fx(t)\underline{\underline{\Delta}}\int_{-\infty}^{\infty} x(t)\exp(-2\pi ift)\,dt=X(f) \qquad \text{IV}$$

while the inverse operator $F^{-1}$ is defined thus:

$$F^{-1}X(f)\underline{\underline{\Delta}}\int_{-\infty}^{\infty} X(f)\exp(2\pi ift)df \qquad \text{V}$$

If $F^{-1}X(f)=x(t)$, it is easy to show that $$F\,X(t)=x(-f) \qquad \text{VI.}$$

The proposition to be proved is:

that $(R+I)\,F\,(R+I)\,X(f)=x(t)$

If $x(t)$ is real, it can be separated into an even and an odd component:

$$x(t)=x_e(t)+x_o(t) \qquad \text{VII.}$$

Let the transforms of $x(t)$, $x_e(t)$ and $x_o(t)$ be denoted by $$F\,x(t)=X(f);\ F\,x_e(t)=X_e(f);\ F\,x_o(t)=X_o(f)$$

Then $$F\,x(t)=X(f)$$

$$=X_e(f)+X_o(f) \qquad \text{VIII.}$$

Furthermore, we can separate $X(f)$ into real and imaginary parts $X_R(f)$ and $i\,X_I(f)$:

$$X(f)=X_R(f)+i\,X_I(f) \qquad \text{IX.}$$

where $X_R(f)$ is purely real, and $i\,X_I(f)$ is purely imaginary. If $X(f)$ is real, then $$X_R(f)=X_e(f)$$

$$i\,X_I(f)=X_o(f)$$

$$(R+I)\,X(f)=(R+I)\,(X_R(f)+i\,X_I(f)) \qquad \text{X.}$$

$$=X_R(f)+X_I(f)$$

$$=X_e(f)-i\,X_o(f)$$

$$F^{-1}\,(R+I)\,X(f)=x_e(t)-i\,x_o(t) \qquad \text{XI.}$$

$$F\,(R+I)\,X(f)=x_e(-t)-i\,x_o(-t) \qquad \text{XII.}$$

$$=x_e(t)+i\,x_o(t)$$

$$(R+I)\,F\,(R+I)\,X(f)=x_e(t)+x_o(t) \qquad \text{XIII.}$$

$$=x(t)$$

When discrete transforms are used, it is similarly easy to show that $$(R+I)\,F\,(R+I)\,X(j)=1/N\,(x)(k) \qquad \text{XIV.}$$

The above analysis has been verified using a fast Fourier transform program on a general purpose computer. The following example shows the transform.

Let $x(k)=1,2,3,4,$ $X(j)=(2.5),(-0.5-i\,0.5),(-0.5),(-0.5+i\,0.5).$

Adding real and imaginary parts:

$$x_1(k)=2.5,-1,-0.5,0$$

Transforming and multiplying by 4:

$$4\,X_1(j)=1,(3-i\,1),(3),(3+i\,1)$$

Adding real and imaginary parts: $c(k)=1,2,3,4.$

From the foregoing, it should be clear that the basic method involved consists of simultaneously introducing into a Fourier transform device a first block of data which has been converted from the time domain to the frequency domain and a second block of data in the time domain to produce an equalized or filtered first block of data at an output which is in the time domain alone. While the transforming, separating and modifying operations are generally known, what is new are the steps of adding algebraically the values of the real and imaginary parts of a block of data which has been previously modified by a filter characteristic and transformed in a Fourier transform device to the frequency domain to provide an output consisting of N parts; applying this output to a Fourier transform device to reconvert it to an output of N complex parts in an apparent frequency domain; separating this output into frequency and time domain components each of N complex parts and adding algebraically the values of the real and imaginary parts of the time domain component to provide an equalized block of data consisting of N real parts in the time domain. At this point, it should be appreciated that the output from block 14 which has been shown in FIG. 3 as $X_1(j)$ is shown as a function in the frequency domain. This is more properly characterized as being in an apparent frequency domain because the output is in reality in the time domain as a result of the function $x_1(k)$ applied at terminal 11 being in the frequency domain. This input, however, is treated as if it consisted of N real numbers in the time domain. It now becomes obvious that regardless of how the domainsare characterized, transforming a function in the frequency domain transforms that function into the time domain. As a result, the output indicated in block 14 is literally in the time domain but has been characterized as an apparent frequency domain to maintain the mathematical relationships involved.

Up until this point, the various portions of FIG. 3 have been described only in terms of inputs and outputs to the various blocks and in terms of the functions carried out by the various blocks. In terms of actual hardware, fast Fourier transform device 1 may be any one of a number of commercially available fast Fourier transform devices. For example, a commercially available Time/Data System manufactured by Time/Data Corporation of Palo Alto, Calif. has the desired characteristics and features which would permit its use in the system of FIG. 3. Another commercially available processor which can carry out a fast Fourier transformation is the ATP computer manufactured by Raytheon. Another appropriate digital processor which is capable of carrying out the fast Fourier transformations required for the present invention is described in an article entitled "A Digital Processor to Generate Spectra in Real Time," by R. R. Shiveley, IEEE Transactions on Computers, Vol. 2–17, No. 5, May 1968.

In an analog regime, a multiplier 15 may be any one of a number of commercially available multiplier devices similar to model 5822 analog multiplier available from Optical Electronics, Inc., Tucson, Ariz. It should be appreciated that where data is digital that the appropriate output is provided, in the normal course of events, by a properly programmed general purpose computer.

Adders 17 and 18 may be any one of a number of commercially available operational amplifiers which provide at their output the algebraic sum of the values of signals appearing at their inputs.

Filter function generator 16 may be a commercially available read only memory or register which ditigally stores the filter characteristic consisting of N complex numbers.

Figure 4:
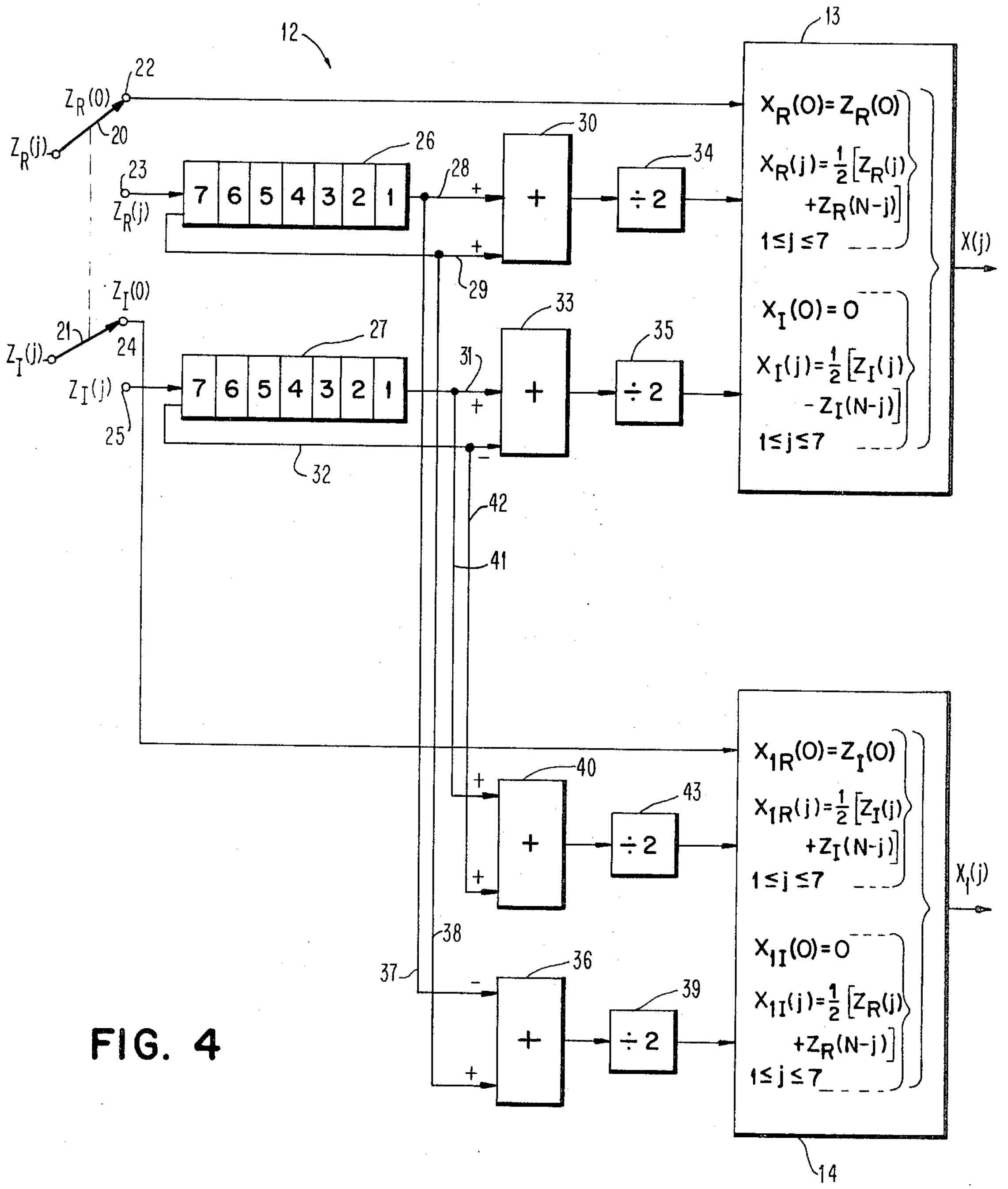
FIG. 4 is a partial schematic-partial block diagram of a separator or splitter utilized in the present disclosure to provide at its outputs a component in the time domain consisting of N complex numbers and a component in the frequency domain of N complex numbers.

Separator 12 which splits the function $Z(j)$ into the components $X_1(j)$ and $X(j)$ may take the form shown in FIG. 4, for example. The function $Z(j)$ is shown in FIG. 4 being applied to the input of switches 20 and 21 as the real part $Z_R(j)$ of the function $Z(j)$ and the imaginary part $Z_I(j)$ of the function $Z(j)$, respectively. The object of the circuit of FIG. 4 is to provide the functions $X(j)$ and $X_1(j)$ by carrying out the operations shown in blocks 13 and 14 of FIG. 3. The function of block 13 is to provide an algebraic summation of the function $Z(j)$ and the complex conjugate $Z^*(N-j)$. The function of block 14 is similar except that the difference between the two functions is provided. The circuit of FIG. 4 takes advantage of the fact that a transform of a real function may be separated into real and imaginary components according to the oddness or evenness of its parts. Thus, by combining the even portion of the input $Z_R(j)$ with the odd part of $Z_I(j)$, the function $X(j)$ may be obtained at the output of block 13. In like manner, by combining the odd and even portions of the real $Z_R(j)$ and imaginary $Z_I(j)$ parts of $Z(j)$, the output $X_1(j)$ is obtained at the output of block 14. The mathematical explanation of what occurs in FIG. 4 is outlined in equations I through XIV above.

Returning now to FIG. 4, the real and imaginary parts of the function $Z(j)$ are applied to terminals 22 to 25 in the following manner.

Assuming a function Z(j) having N = 8 parts as follows $Z(j)$: $Z(0), Z(1), Z(2), Z(3) \ldots Z(7)$.

At a given instant, the first part $Z_R(0)$ is applied at terminal 22. Simultaneously, the first part of the function $Z_I(j)$, $Z_I(0)$, is applied to terminal 24. Switches 20 and 21 are then activated to contact terminals 23 and 25. In the time that follows, the remaining parts of the real and imaginary portions of $Z(j)$ are loaded into shift registers 26 and 27, respectively. While shift registers 26 and 27 have been represented as single devices, they could, in fact, each be a pair of shift registers connected in parallel so arranged that the application of read out pulses provide a read out of one register in the forward and a read out of the second register in a backward direction.

The forward and backward portions of register 26 are applied via conductors 28, 29, respectively, to an adder 30 yielding at its output a summation of the values of the forward and backward portions obtained from shift register 26. In like manner, the output of shift register 27 is applied via conductors 31 and 32 to an adder 33 to provide at its output a summation of the forward and backward outputs of shift register 27. An inverter (not shown) disposed in series with conductor 32 inverts the backwardly read out portion of register 27. The output of adders 30 and 33 is applied to dividers 34, 35, respectively, where the resultant output is divided by two. In the manner just described, the even parts of the function $Z(j)$ appear at the output of divider 34 as the real component of the function $X(j)$ while the odd part of the function $Z(j)$ appears at the output of divider 35 as the imaginary part of the function $X(j)$.

At the same time the real and imaginary components of the function $X(j)$ are being provided, the real and imaginary parts of the function $X_1(j)$ are also being provided. Thus, the outputs of shift register 26 are provided to an adder 36 via conductors 37 and 38 to provide at the output of adder 36 an output which is the imaginary component of the function $X_1(j)$. This last output is obtained after dividing the output of adder 36 by two in a divider 39. The real portion of the function $X_1(j)$ is provided by connecting the outputs of shift register 27 to an adder 40 via conductors 41 and 42. The output of adder 40 after being divided by two in a divider 43 is the real component of the function $X_1(j)$. Conductor 37 contains an inverter (not shown) which inverts the forwardly read out output of shift register 26. The real and imaginary components of the functions $X(j)$ and $X_1(j)$ have now been assembled out of the odd and even parts of the real portion of the function $Z(j)$ and out of the odd and even parts of the imaginary portion of the function $Z(j)$. Once the real and imaginary components of the functions $X(j)$ and $X_1(j)$ have been assembled, these components are applied to adders 17 and 18 in FIG. 3 where the values of the real and imaginary parts are algebraically added to provide the desired outputs. In the instance of adder 18, the output provided is a filtered or equalized version of the input initially applied at terminal 10 of fast Fourier transform device 1. The output of adder 17 which has been modified by a desired filter function is an output in the frequency domain which is treated as a block of real numbers in the time domain and fed back to terminal 11 of fast Fourier transform device 1 to be applied simultaneously with a new block of data consisting of a block of numbers in the time domain.

Up until this point, only hardware applications of the method of the present invention have been discussed. It should be appreciated, that the apparatus of FIG. 3 can be implemented utilizing a general purpose computer which is programmed to carry out the steps shown in the flow diagram of FIG. 5.

Figure 5:
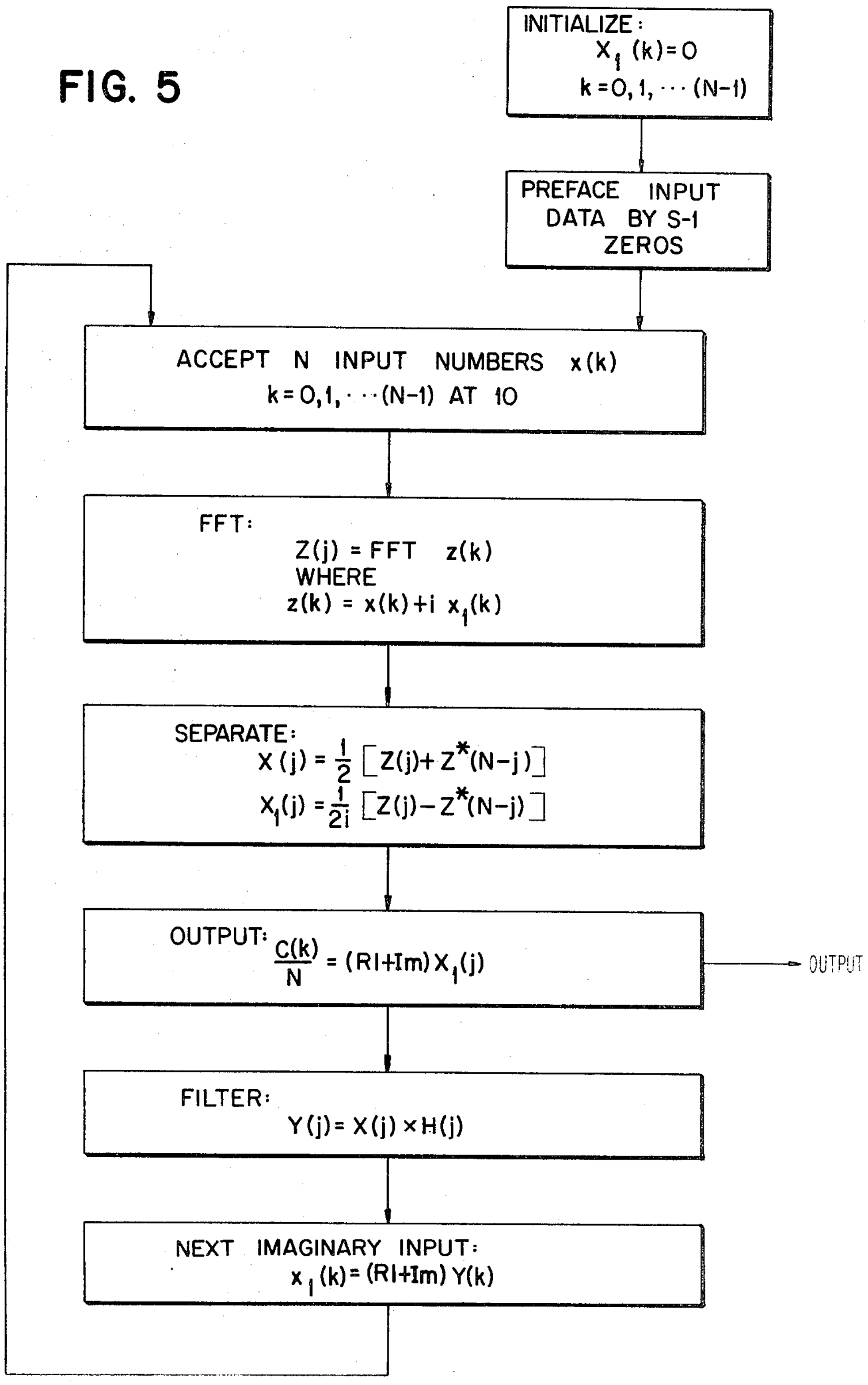
FIG. 5 is a flowchart of the steps required in programming a general purpose computer to obtain a filtered or equalized version of digital or sampled analog data.

Before discussing the steps involved in the flow diagram of FIG. 5, the following background information should be helpful to those skilled in the art in the computer simulation of filters and equalizers, for example.

The following shows how digital convolution may be used to determine the output of a filter impulse response $h(k)$, $k = 0, 1 \ldots (N-1$. The sampled values of the output $c(k)$ are obtained from those of the input $x(k)$ by use of discrete convolution:

$$c(k) = \frac{1}{N} \sum_{r=0}^{N-1} x(r) h(k-r)$$

As is well known, convolution in the time domain is equivalent to multiplication in the frequency domain.

If $x(k)$, $h(k)$, $k = 0, 1, \ldots N-1$ are given, their transforms in the frequency domain are $$X(j) = \text{DFT}\, x(k)$$

$$= \frac{1}{N} \sum_{k=0}^{N-1} x(k) \exp\left[-2\pi ijk/N\right]$$

$$H(j)=\frac{1}{N}\sum_{k=0}^{N-1} h(k)\exp[-2\pi ijk/N]$$

$$j=0,1\ldots N-1$$

where DFT means the "Discrete Fourier Transform." The transform of the output $c(k)$ is $C(j)$ where $$C(j)=G(j)\times H(j)$$

The time domain output $c(k)$ is obtained by use of the Inverse Discrete Fourier Transform (IDFT):

$$C(k)=IDFT\ C(j)$$

$$=\sum_{j=0}^{N-1} C(j)\exp[2\pi ijk/n]$$

All the quantities $x(k)$, $X(j)$, $h(k)$, $H(j)$, and $c(k)$, $C(j)$ are periodic, e.g.,:

$$c(k+N)=c(k)$$

$$C(j+N)=C(j)$$

and consequently any N successive terms can be used in the summations.

Straightforward evaluation of either transform requires $N^2$ multiplications. The Fast Fourier Algorithm permits this number to be drastically reduced.

Because the result of the convolution may be almost twice as long as either of its inputs, and because $x(k)$, $h(k)$ are periodic when the DFT is used, the result may be erroneous due to wrap-around error. When functions $x(k)$ and $h(k)$ are being subjected to a convolution, the periodic repetitions contribute unwanted quantities. Several techniques to overcome this problem are known. One solution is to append zeros to $x(k)$ and $h(k)$ to make the period N R+S where initially $x(k)$ has S points and $h(k)$ has R points. No error then occurs.

The use of only one transform is shown in FIG. 3. Since the input points $x(k)$ are real, whereas the DFT can deal with complex inputs, a second set of N real numbers may be treated as imaginary and added to those of $x(k)$. After the transformation, the transforms of the real and imaginary sets may be separated by simple additions.

$$Z(j)=DFT\,[x(k)+i\,x_1(k)]$$

$$G(j)=\tfrac{1}{2}\,[Z(j)+Z^*(N-j)]$$

$$G_1(j)=\tfrac{1}{2i}\,[Z(j)-Z^*(Nj)]$$

$X(j)$ may be multiplied by $H(j)$ as usual. The new algorithm now simply adds the real and imaginary parts of GH:

$$g_1=Rl\,[GH]+Im[GH]$$

During the next iteration, the transform of $x_1$ is obtained as already mentioned. But the sum of the real and imaginary parts of the transform $X_1(j)$ is in fact the desired $c(k)/N$. This is so because of the following equation:

$$(Rl+Im)\,F\,(Rl+Im)\,C(j)=c(k)/N$$

Where $Rl$ and $Im$ are operators denoting "the real part of" and "the imaginary part of," while F denotes the Discrete Fourier transform.

Continuous digital filtering is accomplished as follows. Input points are taken N at a time, and simultaneously transformed with N points for the inverse transform. After separation, (N–S+1) result points are available, where S is the number of points in $h(k)$. Although N points of the input are used each time, only (N–S+1) of them are new each time. There is an optimum choice for $N > S$ to minimize computation, (approximately $S\log_2 S$).

This form of digital filter achieves precisely the same result as the convolution discussed above, but does it faster. The speed gain increases with the length of the equivalent convolution.

Referring now to FIG. 5, in carrying out the programming of a general purpose computer the first step is to initialize, i.e., provide the computer with a set of real number $x_1(k) = 0$, where $k = 0, 1, \ldots (N-1)$. When every portion of the sampled waveform is considered to be important, the input data is prefaced by S-1 zeros. After initialization, the first instruction is to accept N input numbers $x(k)$, where $k = 0, 1, \ldots (N-1)$. In FIG. 3, this is the data which would be applied at terminal 10 of fast Fourier transform device 1. The next instruction is to carry out a fast Fourier transform to provide an output $Z(j) =$ FFT $z(k)$ where $z(k) = x(k) + i\,x_1(k)$. The next instruction is to separate to provide the outputs shown in 13 and 14 of FIG. 3. The next instruction is to provide an output $c(k)/N = (Rl + Im)\,X_1(j)$. This instruction amounts to the step of adding the magnitudes of the real and imaginary values to provide an output which is an equalized version of an input initially applied on terminal 10 of the fast Fourier transform device of FIG. 3. The next instruction is to filter, that is, to modify the output of block 13 $X(j)$ by a filter characteristic $H(j)$ to provide the function $Y(j)$. The next instruction is to utilize the previous output as the next imaginary input, that is, $X_1(k) = (Rl + Im)\,Y(k)$. The resulting output is then fed back as data which, in FIG. 3, is applied to terminal 11 of fast Fourier transform device 1. The instructions are then carried out on both sets of data simultaneously to provide a continuous stream of data which is the modified version of data initially applied on terminal 10 of fast Fourier transform device 1.

While the above-described apparatus has been disclosed in connection with Fourier transformation steps and Fourier transform devices, it should be appreciated that the same method and apparatus can be utilized with other transform apparatus and transformation steps. To be properly utilized, the property required is that the transform of a real function provide real and imaginary parts which are, respectively, even and odd or vice versa. As long as this criterion is fulfilled, any transform, a La Place transform, for example, may be utilized. Further, it should also be appreciated that while time and frequency domains have been referred to hereinabove in describing the preferred embodiments that transformations need not be limited to the time and frequency domains. Transformations may be made between any two domains, space and its transform, for example, without limitation as long as they can be mathematically categorized and fulfill the property indicated hereinabove.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data modifying system including a transformation device having first and second input terminals, a separator connected to the output of said device providing a first transformed output at a first output and a second transformed output at a second output and means connected to said second output for modifying said second transformed output by a given characteristic comprising:

first and second means connected to said first output and to said modifying means, respectively, for adding algebraically the values of the real and imaginary parts of said first output and said modified second output, respectively, to provide a modified version of an input applied to said input terminal at the output of said first adding means and a further modified output at the output of said second adding means, respectively, and feedback means connected to said second input terminal and said second adding means for applying the output of the latter to said second input terminal along with an input on said first terminal which is subsequent to said first-mentioned input on said first terminal.

2. Apparatus for providing modified blocks of data in a first domain comprising:
a transformation device having two input terminals,
means for applying a first block of data in said first domain to one terminal of said device,
means for separating the output of said device to provide at least a first block of data which has been converted to a second domain,
means connected to said separating means for modifying said block of data in said second domain by a given characteristic to produce a modified first block of data in said second domain,
first means connected to said modifying means for adding algebraically the value of the real and imaginary parts of said modified first block of data,
means for applying the output of said adder to the other of said input terminals to carry out a transformation on said output of said adder, and
second means connected to said separating means for adding algebraically the values of the real and imaginary parts of the output of said separator in the first domain to provide a modified version of said first block of data in said first domain.

3. Apparatus according to claim 2 wherein said transformation device is capable of providing real and imaginary parts of a real function which are, respectively, even and odd or vice versa.

4. Apparatus according to claim 2 wherein said means for applying a first block of data in the said first domain includes a data receiver.

5. Apparatus according to claim 2 wherein said first and second means for adding are operational amplifiers which provide at their outputs the algebraic sum of the values of signals appearing at their inputs.

6. Apparatus according to claim 2 wherein said means for modifying includes a multiplier and means for generating a filter characteristic in said second domain to provide a modified output in said second domain.

7. Apparatus according to claim 6 wherein said means for generating a filter characteristic includes storage means for providing in digital form a block of N complex numbers.

8. Apparatus for providing modified blocks of data in a first domain comprising:
a transformation device having two input terminals,
means for applying a first block of data in said first domain to one terminal of said device,
means for separating the output of said device to provide at least a first block of data which has been converted to a second domain,
first means connected to said separating means for modifying said block of data in said second domain by a given characteristic to produce a modified first block of data in said second domain,
means connected to said modifying means for adding algebraically the value of the real and imaginary parts of said modified first block of data,
means connecting the output of said first adding means to the other of said input terminals for transforming said output of said first adding means to provide a transformed first adder input to said separating means,
means for simultaneously applying a second block of data in said first domain to said one input terminal to provide a transformed second block of data, and
second means connected to said separating means for adding algebraically the values of the real and imaginary parts of the output of said separator in the first domain to provide a modified version of said first block of data in said first domain.

9. Apparatus for providing equalized or filtered blocks of data in the time domain comprising:
a Fourier transform device having two input terminals,
means for applying a first block of data in the time domain to one terminal of said device,
means for separating the output of said device to provide at least a first block of data which has been converted to the frequency domain,
means connected to said separating means for modifying said first block of data in the frequency domain by a given filter characteristic to produce a modified first block of data in the frequency domain,
first means connected to said modifying means for adding algebraically the value of the real and imaginary parts of said modified first block of data in the frequency domain,
means for applying the output of said adder to the other of said input terminals to carry out a Fourier transformation on said output of said adder, and
second means connected to said separating means for adding algebraically the values of the real and imaginary parts of an output of said separator in the time domain to provide an equalized version of said first block of data.

10. Apparatus according to claim 9 wherein said first and second means for adding are operational amplifiers which provide at their outputs the algebraic sum of the values of signals appearing at their inputs.

11. Apparatus for providing equalized or filtered blocks of data in the time domain comprising:
a Fourier transform device having two input terminals
means for applying a first block of data in the time domain to one terminal of said device,
means for separating the output of said device to provide at least a first block of data which has been converted to the frequency domain,
means connected to said separating means for modifying said first block of data in the frequency domain by a given filter characteristic to produce a modified first block of data in the frequency domain,
first means connected to said modifying means for adding algebraically the value of the real and imaginary parts of said modified first block of data in the frequency domain,
means connecting the output of said first adding means to the other of said input terminals for transforming said output of said first adding means to provide a transformed first adder input to said separating means,
means for simultaneously applying a second block of data in said first domain to said one input terminal to provide a transformed second block of data, and,
second means connected to said separating means for adding algebraically the values of the real and imaginary parts of an output of said separator in the time domain to provide an equalized version of said first block of data.

12. Apparatus according to claim 11 wherein said first and second means for adding are operational amplifiers which provide at their outputs the algebraic sum of the values of signals appearing at their inputs.

13. Apparatus according to claim 11 wherein said means for modifying includes a multiplier and means for generating a filter characteristic in the frequency domain to provide a modified output in the frequency domain.

14. Apparatus according to claim 13 wherein said means for generating a filter characteristic includes storage means for providing in digital form a block of N complex numbers.

15. In a method for modifying a block of data consisting of N real parts in a first domain, which has been previously applied to one of a pair of terminals of a transformation device, transformed to a second domain, separated and modified by a given characteristic to provide a transformed and modified first block of data in a second domain, the steps of:
adding algebraically the values of the real and imaginary parts of said block of data in said second domain to provide an output consisting of N parts,
applying said output consisting of N parts to the other of said pair of terminals of said transformation device to convert said output to N complex parts in an apparent second domain,
separating said output in the apparent second domain into second domain and first domain components each of N complex parts, and adding algebraically the values of the real and imaginary parts of said first domain component to provide a modified block of data consisting of N real parts in the first domain.

16. A method for providing modified blocks of data in a first domain comprising the steps of:

applying a first block of data in the first domain to one input terminal of a transformation device which has two input terminals, separating the output of said device in a separator to provide at least a first block of data which has been converted to a second domain, modifying said first block of data in the second domain by a given characteristic in a multiplier, adding algebraically the values of the real and imaginary parts of said modified first block of data in the second domain in an adder, applying the output of said adder to the other of said input terminals and transforming said output of said adder, separating the output of said device in said separator to provide at least a transformed adder output in the first domain, and adding algebraically the values of the real and imaginary parts of said transformed adder output to provide a modified version of said first block of data in the first domain.

17. A method for providing modified blocks of data in a first domain comprising the steps of:

applying a first block of data in the first domain to one input terminal of a transformation device which has two input terminals, separating the output of said device in a separator to provide at least a first block of data which has been converted to a second domain, modifying said first block of data in the second domain by a given characteristic in a multiplier, adding algebraically the values of the real and imaginary parts of said modified first block of data in the second domain in an adder, applying the output of said adder to the other of said input terminals while simultaneously applying a second block of data in the first domain to said one input terminal and transforming said output of said adder and said second block of data, separating the output of said device in said separator to provide a transformed adder output in the first domain and a transformed second block of data output in the second domain, and adding algebraically the values of the real and imaginary parts of said transformed adder output to provide a modified version of said first block of data in the first domain.

18. A method according to claim 17 wherein said first block of data consists of N real parts, said output of said device consists of N complex parts, said output of said adder in the second domain consists of N real parts, said transformed adder output consists of N complex parts and said modified version of said first block of data consists of N real parts.

19. In a method for filtering a block of data consisting of N real parts in the time domain which has been previously applied to one of a pair of terminals of a Fourier transform device, transformed to a second domain, separated and modified by a given characteristic to provide a transformed and modified first block of data in a second domain, the steps of:

adding algebraically the values of the real and imaginary parts of said block of data in said second domain to provide an output consisting of N parts, applying said output consisting of N parts to the other of said pair of terminals of said Fourier transform device to convert said output to N complex parts in an apparent frequency domain, separating said output in the apparent frequency domain into frequency domain and time domain components each of N complex parts, and adding algebraically the values of the real and imaginary parts of said time domain component to provide an equalized block of data consisting of N real parts in the time domain.

20. A method for providing equalized blocks of data in the time domain comprising the steps of:

applying a first block of data in the time domain to one input terminal of a Fourier transform device which has two input terminals, separating the output of said device in a separator to provide at least a first block of data which has been converted to the frequency domain, modifying said first block of data in the frequency domain by a given filter characteristic in a multiplier, adding algebraically the values of the real and imaginary parts of said modified first block of data in the frequency domain in an adder, applying the output of said adder to the other of said input terminals and carrying out a Fourier transformation on said output of said adder, separating the output of said device in said separator to provide at least a transformed adder output in the time domain, and adding algebraically the values of the real and imaginary parts of said transformed adder output to provide an equalized version of said first block of data in the time domain.

21. A method for providing equalized blocks of data in the time domain comprising the steps of:

applying a first block of data in the time domain to one input terminal of a Fourier transform device which has two input terminals, separating the output of said device in a separator to provide at least a first block of data which has been converted to the frequency domain, modifying said first block of data in the frequency domain by a given filter characteristic in a multiplier, adding algebraically the values of the real and imaginary parts of said modified first block of data in the frequency domain in an adder, applying the output of said adder to the other of said input terminals while simultaneously applying a second block of data in the time domain to said one input terminal and carrying out a Fourier transformation on said output of said adder and on said second block of data, separating the output of said device in said separator to provide a transformed adder output in the time domain and a transformed second block of data output in the frequency domain, and adding algebraically the values of the real and imaginary parts of said transformed adder output to provide an equalized version of said first block of data in the time domain.

22. A method according to claim 21 wherein said first block of data consists of N real parts, said output of said device consists of N complex parts, said output of said adder in the frequency domain consists of N real parts, said transformed adder output consists of N complex parts and said equalized version of said first block of data consists of N real parts.

* * * * *